S. BROWN.
Combined Drill, Planter and Roller.
No. 168,714.
Patented Oct. 11, 1875.
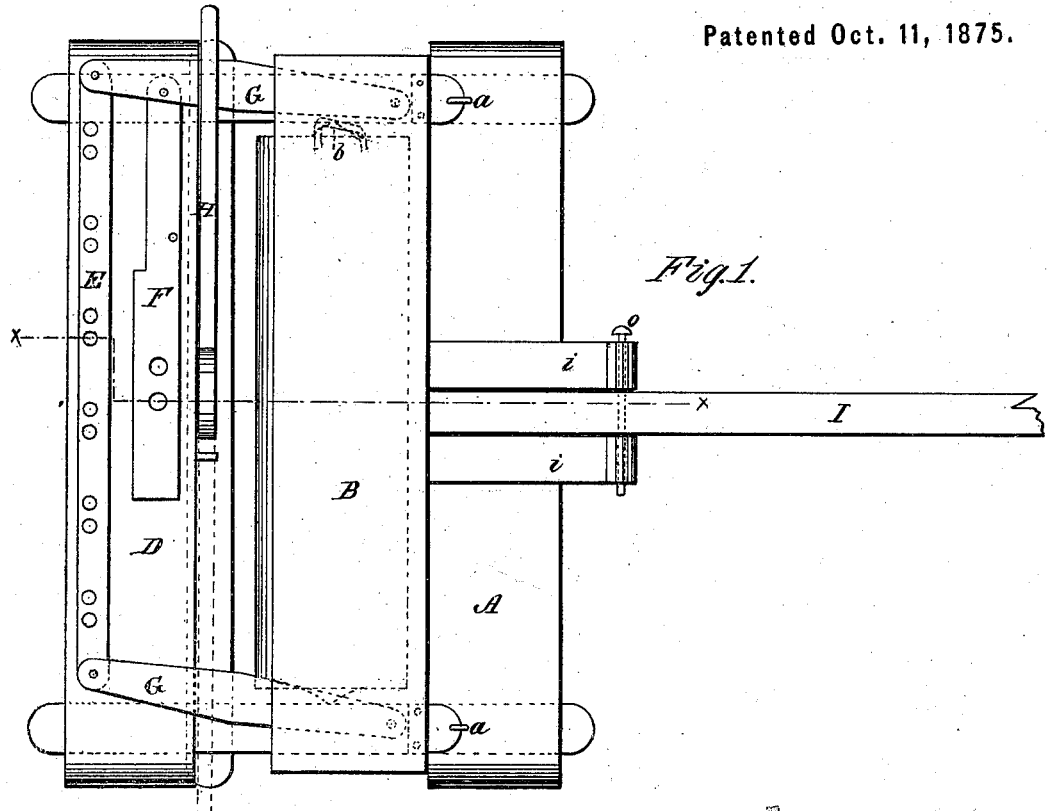
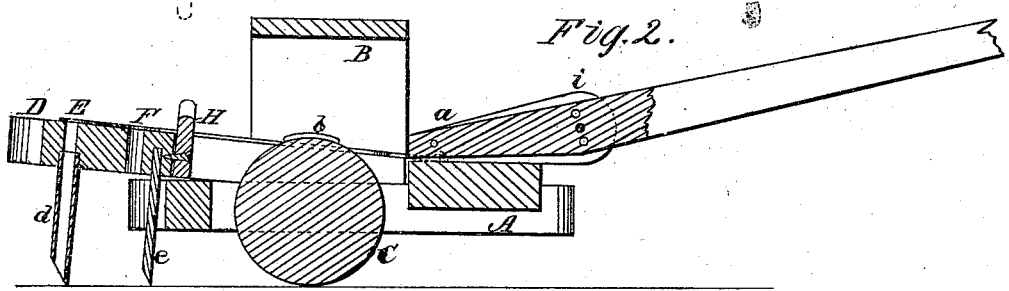
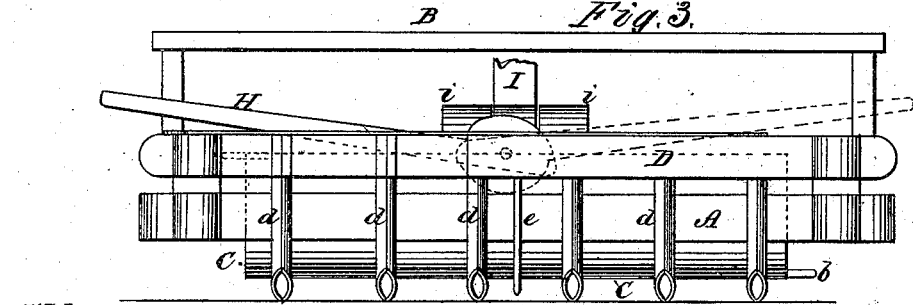
Witnesses
M. Wallace
Geo. H. Greenleaf
Inventor
Samuel Brown

UNITED STATES PATENT OFFICE.

SAMUEL BROWN, OF LEBANON, MISSOURI.

IMPROVEMENT IN COMBINED DRILLS, PLANTERS, AND ROLLERS.

Specification forming part of Letters Patent No. 168,714, dated October 11, 1875; application filed November 6, 1873.

*To all whom it may concern:*

Be it known that I, SAMUEL BROWN, of Lebanon, in the county of Laclede and State of Missouri, have invented a new and Improved Combined Wheat-Drill, Corn-Planter, and Roller; and I do hereby declare that the following is a full, clear, and exact description of the same, reference being had to the accompanying drawing forming a part of this specification, in which—

Figure 1 is a plan view of the machine; Fig. 2, a cross-section on line x x of Fig. 1; and Fig. 3, a rear view.

The invention relates to an improvement in combined rolling and seeding machines; and consists in a hinged frame carrying seed-hoppers and provided with drill-teeth; also, a cam-lever and seed-dropping slides so arranged and connected with a main frame and roller having cams attached to its ends that when the hinged frame is elevated the slides are raised above the roller and thrown out of action, and the drill-teeth simultaneously raised from the ground by means of the lever which is pivoted to the hinged frame and acts against the roller-frame, as hereinafter described.

In the drawing, A indicates the rectangular main frame of the machine; B, an elevated seat for the driver; and C, the roller, which is suitably journaled in the end bars of the frame A. A wheat and corn hopper (not shown) are, in practice, secured to the rear frame D, which is hinged to the main frame at a a in front of the roller. The perforated wheat-dropping slide E reciprocates at the bottom of one hopper, and the corn-slide F in the other. Both slides E F are pivoted at their ends to the bars or levers G, which are, in turn, pivoted to the hinged frame D, as shown. The slides are reciprocated by the action of the cams b b on the ends of the roller, each of which comes in contact with the adjacent lever G at each revolution of the roller, as will be readily understood. The wheat is discharged through the ordinary form of tubular drill-teeth d, and a tooth, e, is arranged to open a drill or furrow for the corn. Wheat is of course placed in the rear hopper, or corn in the front hopper, according as one or the other is to be drilled in. A cam-lever, H, is pivoted to the cross-bar of hinged frame D, whose function is to elevate said frame, and thus vary the depth to which the drill-teeth enter the ground, or to raise them out of the ground altogether, and at the same time remove the levers out of contact with the cams b on the roller C. When adjusted as shown in dotted lines the cam portion of the lever bears upon the cross-bar of the main frame A, and the seed-dropping mechanism will be out of action, and when adjusted as in full lines said mechanism is in action or ready for action. The tongue I is pivoted to the main frame between the hounds i i, and a number of holes are formed through it at a point near the front of the hounds, to adapt it to be adjusted by means of a bolt, o. Such adjustment of the angle of the tongue has the effect of raising or lowering the rear end of the machine, and assists in holding the drill-teeth out of the ground, or allows them to penetrate it a greater depth than they would otherwise do.

The frame D being hinged, it is evident that its rear end rises and falls independently of the frame A according to the undulation or inequality of the ground.

What I claim is—

The hinged seed-hopper frame provided with drill-teeth and carrying seed-discharge slides and parallel operating-levers G, and the pivoted cam-lever H, the main frame and roller journaled therein and provided with end cams b b, all arranged as shown and described, to operate as and for the purpose specified.

Dated October 27, 1873.

SAMUEL BROWN.

Witnesses:
W. J. WALLACE,
GEO. H. GREENLEAF.